US010124430B2

(12) United States Patent
Adams et al.

(10) Patent No.: US 10,124,430 B2
(45) Date of Patent: Nov. 13, 2018

(54) RECIPROCATING SAW

(71) Applicant: Milwaukee Electric Tool Corporation, Brookfield, WI (US)

(72) Inventors: Joshua Adams, Milwaukee, WI (US); Ryan J. Denissen, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 672 days.

(21) Appl. No.: 14/297,814

(22) Filed: Jun. 6, 2014

(65) Prior Publication Data

US 2014/0360029 A1 Dec. 11, 2014

Related U.S. Application Data

(60) Provisional application No. 61/831,945, filed on Jun. 6, 2013.

(51) Int. Cl.
*B23D 51/00* (2006.01)
*B25F 5/02* (2006.01)

(52) U.S. Cl.
CPC ............. *B23D 51/00* (2013.01); *B25F 5/02* (2013.01)

(58) Field of Classification Search
CPC ............. B23D 49/14; B23D 49/16; B23D 49/162–49/167; B23D 51/10; B23D 51/16; B25F 5/02
USPC ................................... 30/392–394
See application file for complete search history.

(56) References Cited

U.S. PATENT DOCUMENTS

| 2,548,411 | A | * | 4/1951 | Vache | B23D 51/16 144/35.1 |
| 3,033,252 | A | * | 5/1962 | Atkinson | B23D 59/006 30/392 |
| 3,596,525 | A | * | 8/1971 | Niesz | B23D 49/162 173/DIG. 1 |
| 3,722,496 | A |   | 3/1973 | Schuman | |
| 4,352,241 | A |   | 10/1982 | Johansson | |
| 4,580,460 | A | * | 4/1986 | Chang | B23D 51/16 74/395 |
| 4,979,306 | A |   | 12/1990 | Koga et al. | |
| 5,006,740 | A | * | 4/1991 | Palm | H01J 5/20 174/50.62 |
| 5,007,172 | A | * | 4/1991 | Palm | B23D 49/167 30/377 |

(Continued)

FOREIGN PATENT DOCUMENTS

EP 0036516 9/1981
EP 1427574 2/2006
(Continued)

*Primary Examiner* — Laura M Lee
(74) *Attorney, Agent, or Firm* — Michael Best & Friedrich LLP

(57) ABSTRACT

A reciprocating saw including an outer housing positioned along a longitudinal axis of the reciprocating saw. The reciprocating saw also includes a motor casing covering a portion of a motor, and a gear casing positioned within the outer housing and coupled to the motor casing. A rib is formed on either one of the gear casing and the outer housing, and the rib extends substantially parallel to the longitudinal axis. In addition, a window is formed in either one of the outer housing and the motor casing. The rib forms an egress path between the gear casing and the outer housing in communication with the window.

17 Claims, 6 Drawing Sheets

(56) References Cited

U.S. PATENT DOCUMENTS

| | | | | |
|---|---|---|---|---|
| 5,542,183 A * | 8/1996 | Allison | ................ | A62B 3/005 |
| | | | | 30/276 |
| 6,155,149 A * | 12/2000 | Colson | ................ | B23D 59/006 |
| | | | | 30/123 |
| 6,226,877 B1 * | 5/2001 | Ono | .................... | B23D 49/162 |
| | | | | 30/392 |
| 6,523,267 B1 * | 2/2003 | Osada | ................ | B23D 49/162 |
| | | | | 30/382 |
| 6,810,589 B2 * | 11/2004 | Lagaly | ................ | B23D 49/162 |
| | | | | 24/50 |
| 7,089,670 B2 | 4/2006 | Donnerdal | | |
| 7,261,624 B2 | 8/2007 | Wedel et al. | | |
| 7,424,779 B2 * | 9/2008 | Tozawa | ................ | B23D 51/00 |
| | | | | 30/392 |
| 7,913,395 B1 | 3/2011 | Nigh | | |
| 2007/0084066 A1 | 4/2007 | Hastie | | |
| 2010/0147278 A1 | 6/2010 | Tadokoro et al. | | |
| 2012/0297632 A1 * | 11/2012 | Ogura | ................ | B23D 49/162 |
| | | | | 30/392 |

FOREIGN PATENT DOCUMENTS

| | | |
|---|---|---|
| WO | 2003/041921 | 5/2003 |
| WO | 2009/035153 | 3/2009 |

* cited by examiner

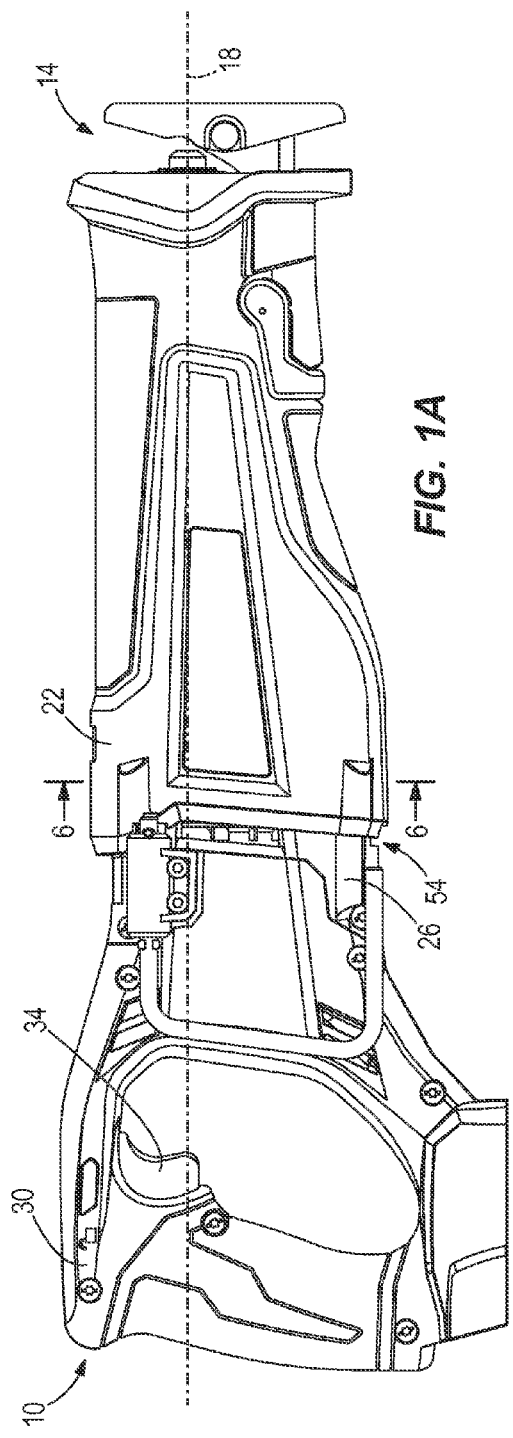
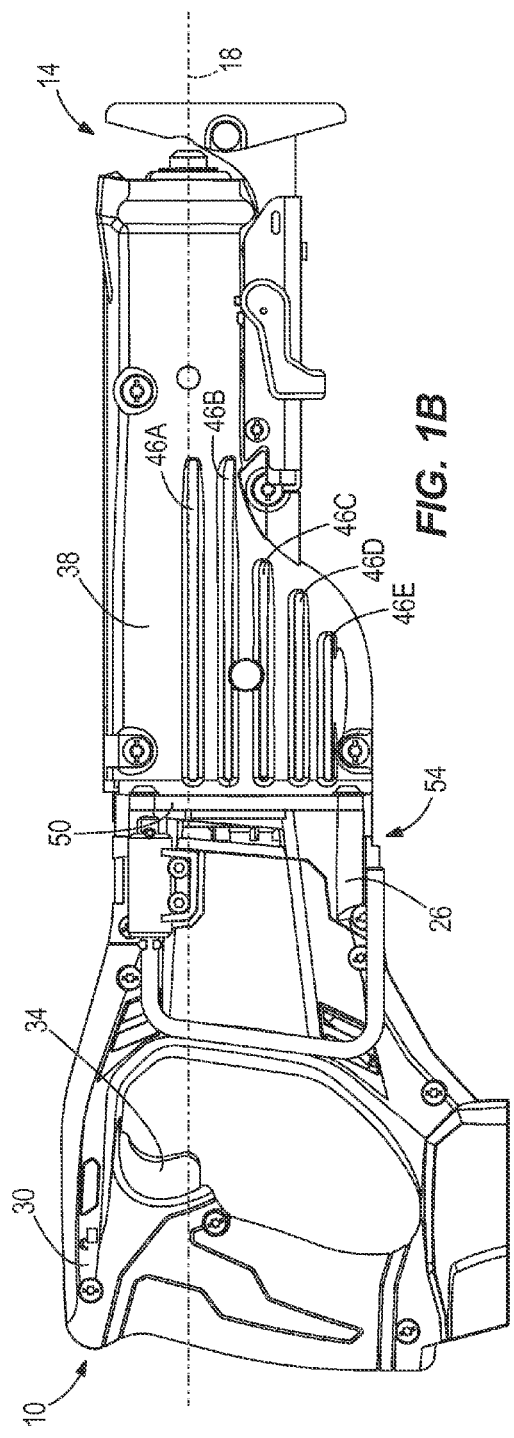

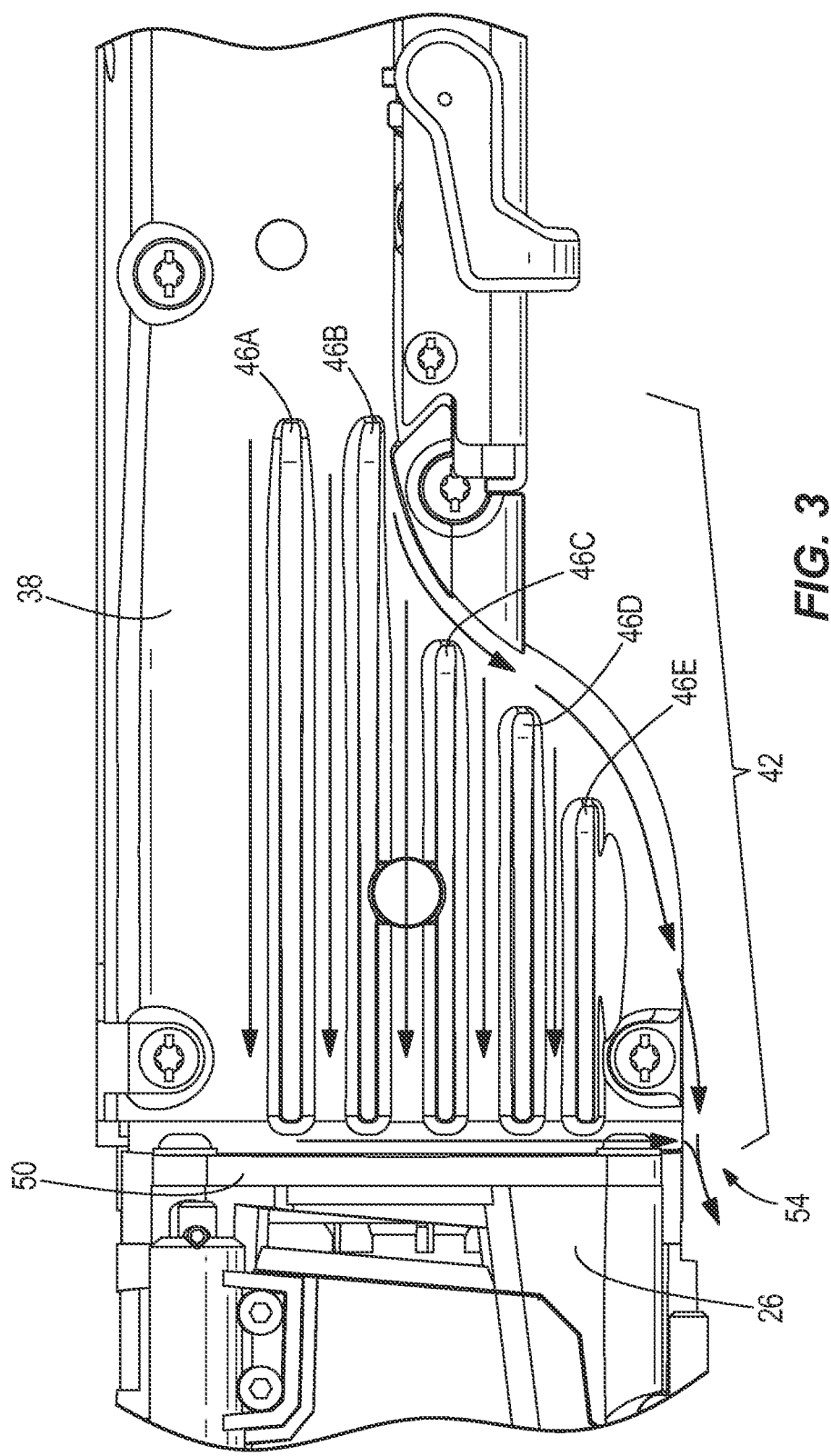

RECIPROCATING SAW

CROSS-REFERENCE TO RELATED APPLICATIONS

This applications claims priority to U.S. Provisional Patent Application No. 61/831,945 filed on Jun. 6, 2013, the entire contents of which are incorporated herein by reference.

FIELD OF THE INVENTION

The present invention relates to power tools, and more specifically, to a reciprocating saw.

BACKGROUND OF THE INVENTION

Traditional reciprocating saws are at risk of foreign material entering and collecting within a housing of the reciprocating saw. Use of a reciprocating saw in certain applications may cause higher risk of foreign material entering a housing of the reciprocating saw. For example, a user may operate a reciprocating saw to cut an overhead plumbing pipe containing water, in which case the saw is at risk of water entering the saw. Water entering the reciprocating saw housing collects within the reciprocating saw causing damage to the tool.

SUMMARY OF THE INVENTION

In one embodiment, the invention provides a reciprocating saw including an outer housing positioned along a longitudinal axis of the reciprocating saw. The reciprocating saw also includes a motor casing covering a portion of a motor, and a gear casing positioned within the outer housing and coupled to the motor casing. A rib is formed on either one of the gear casing and the outer housing, and the rib extends substantially parallel to the longitudinal axis. In addition, a window is formed in either one of the outer housing and the motor casing. The rib forms an egress path between the gear casing and the outer housing in communication with the window.

In an another embodiment, the invention provides a reciprocating saw including an outer housing, a casing positioned within the outer housing, and a rib formed on either one of the casing and the outer housing. The reciprocating saw further includes a window formed in the outer housing, wherein the rib is oriented between the outer housing and the casing to direct movement of a foreign material entering between the outer housing and the casing to the window.

Other aspects of the invention will become apparent by consideration of the detailed description and accompanying drawings.

BRIEF DESCRIPTION OF THE DRAWINGS

FIG. 1A is a side view of a reciprocating saw with an outer housing according to one embodiment of the invention.

FIG. 1B is another side view of the reciprocating saw of FIG. 1A with the outer housing removed.

FIG. 3 is an enlarged side view of the reciprocating saw of FIG. 1A with the outer housing removed.

Figure 2A:
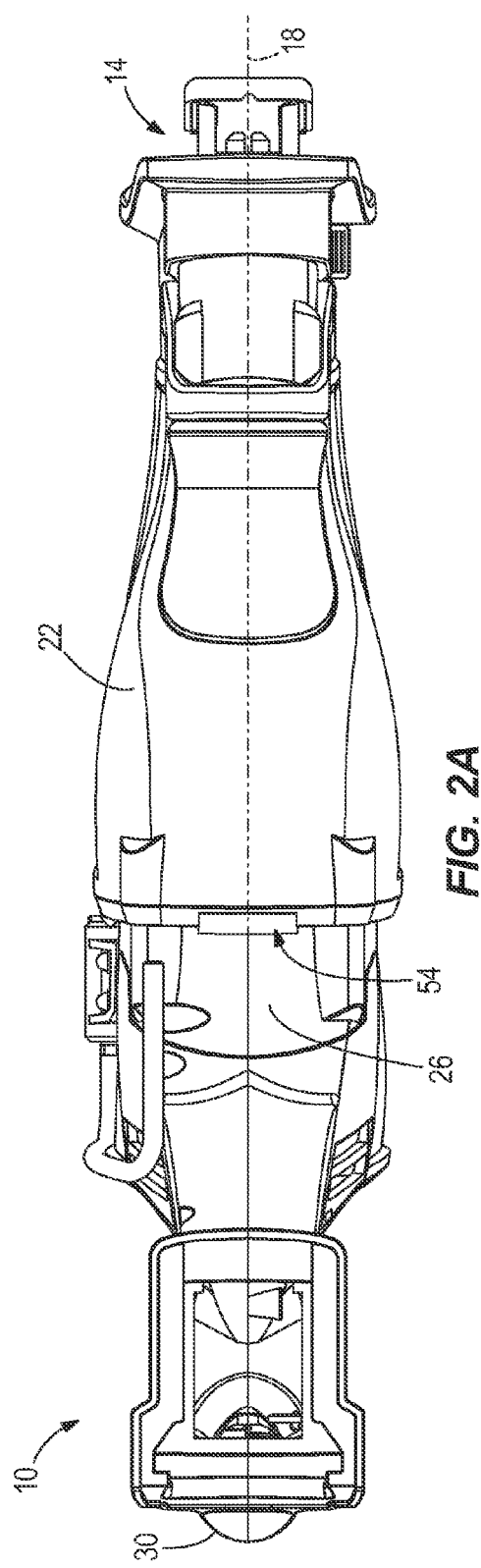
FIG. 2A is a bottom view of the reciprocating saw of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIG. 1A illustrates a reciprocating saw 10 including a saw blade (not shown) inserted in a blade end 14 of the reciprocating saw 10, where the blade is supported for translation along a longitudinal axis 18. The reciprocating saw 10 includes an outer housing 22 coupled to a motor casing 26 enclosing a motor (not shown) of the reciprocating saw 10. The motor may be a brushless or brushed DC motor powered by a DC power source, such as a battery (not shown). Alternatively, the motor may be an AC motor powered by a remote AC power source (e.g., a wall outlet) using a power cord. Extending from the motor casing 26 is a handle portion 30, which includes a trigger 34 to allow a user to activate the reciprocating saw 10.

The outer housing 22 partially surrounds a gear casing 38 clearly shown in FIG. 1B with the outer housing 22 removed. The gear casing 38 is also coupled to the motor casing 26 and encloses a rotary to linear power converter (not shown) to transfer the rotation of the motor to translation of the saw blade. The gear casing 38 is positioned within the outer housing 22, and there exists spacing at the blade end 14 of the reciprocating tool 10 between the outer housing 22 and the gear casing 38 where foreign material (e.g., a liquid) can enter. For example, a liquid such as water could enter the reciprocating saw 10 at the blade end 14 between the gear casing 38 and the outer housing 22 when cutting an overhead plumbing pipe containing water. As described in detail below, the reciprocating saw 10 includes an egress (i.e., exit) path 42 (FIG. 3) for the foreign material entering between the gear casing 38 and the outer housing 22.

With reference to FIG. 1B, the egress path 42 partially consists of ribs 46A-46E extending out from a side of the gear casing 38. The ribs 46A-46E extend substantially parallel to the longitudinal axis 18, and are spaced apart from each other. The ribs 46A-46E extend different lengths along the gear casing 38, with ribs 46A and 46B extending the longest distance and the rib 46E extending the shortest distance. The ribs 46A-46E are spaced apart from an end plate 50 formed in the gear casing 38 that is used to couple the gear casing 38 to the motor casing 26. In other words, foreign material is allowed to flow or move around the ribs 46A-46E and is not trapped between the ribs 46A-46E and the end plate 50. In the illustrated embodiment, the ribs 46A-46E extend outwardly from an outer surface of the gear casing 38. In alternative embodiments, the ribs 46A-46E may extend inwardly from an inner surface of the outer housing 22. In further alternatives, the ribs 46A-46E may include a combination of ribs extending outwardly from an outer surface of the gear casing 38 and ribs extending inwardly from an inner surface of the outer housing 22.

Figure 2B:
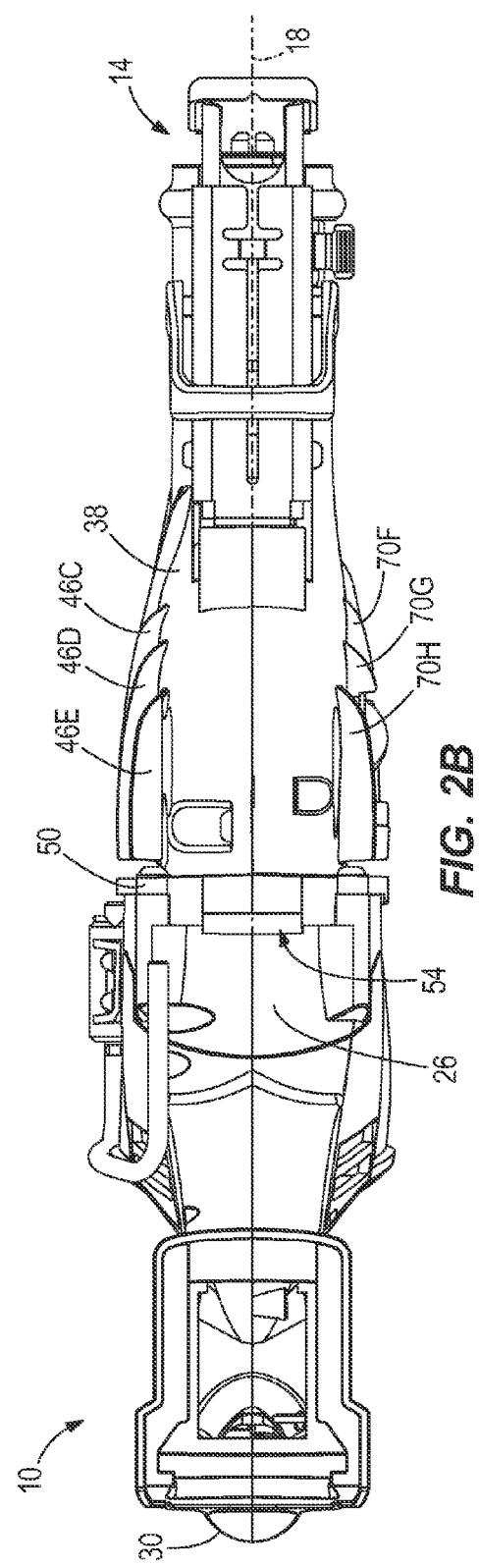
FIG. 2B is another bottom view of the reciprocating saw of FIG. 1A with the outer housing removed.
Figure 4:
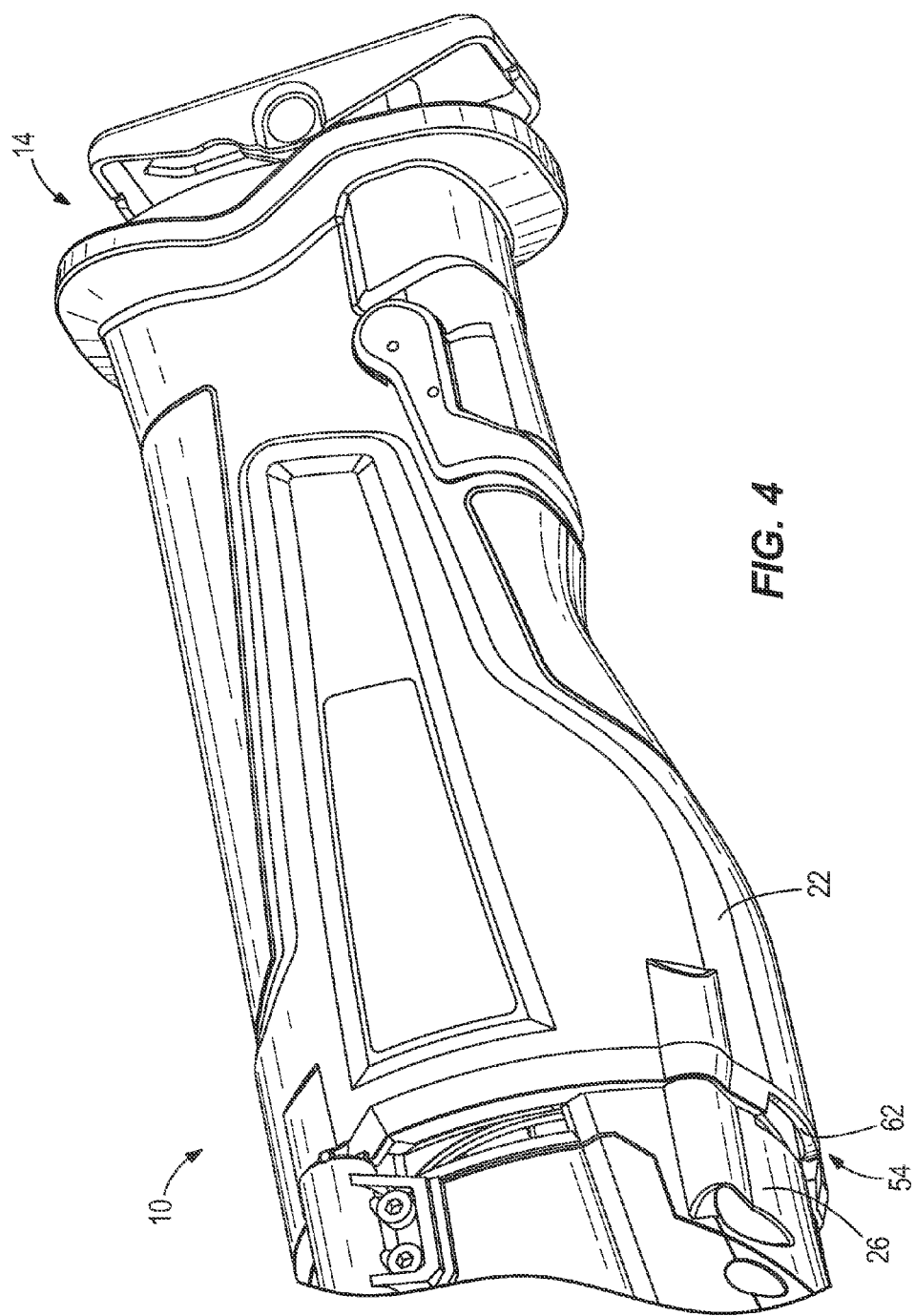
FIG. 4 is a bottom perspective view of the reciprocating saw of FIG. 1A.

With reference to FIGS. 2A and 4, the egress path 42 further includes a window 54 (i.e., aperture) through which the foreign material exits the reciprocating tool 10. In the illustrated embodiment, the window 54 (FIG. 4) is formed partially in the motor casing 26 and partially in the outer housing 22, and the window is partially bounded by the end plate 50 of the gear casing 38. However, in alternative embodiments, the window 54 may be formed completely in the motor casing 26 or completely in the outer housing 22. In addition, the window may be bounded by either the motor casing 26 or the gear casing 38. In further alternatives, the gear casing 28 may include a projection to abut and plastically deform the outer housing 22, so that when the outer housing 22 is installed over the gear casing 28 a window is created via the plastic deformation of the outer housing 22. With reference to FIG. 2B, the outer housing 22 is removed to illustrate again the spacing between the end plate 50 and the ribs 46A-46E.

With reference to FIG. 3, the egress path 42 is illustrated with arrows indicating the travel of a liquid foreign material. If the reciprocating saw 10 was being used in an overhead cut (i.e., with the blade end 14 tilted upward with respect to horizontal) and liquid entered between the gear casing 26 and the outer housing 22, the liquid would flow along the ribs 46A-46E toward the end plate 50 where the water would then be redirected toward the window 54, thereby exiting the reciprocating saw 10.

Figure 5:
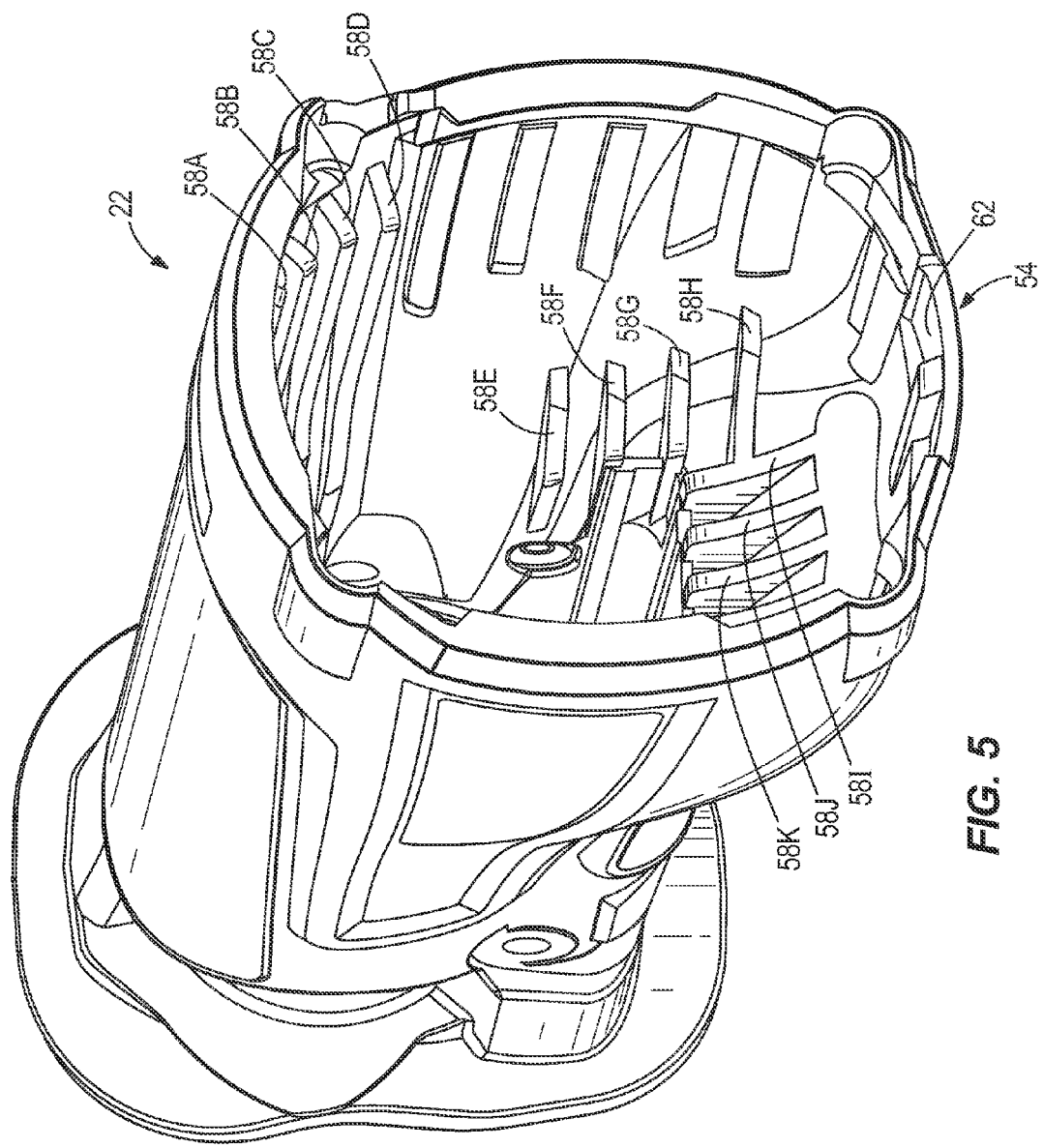
FIG. 5 is a rear perspective view of the outer housing of FIG. 1A.

Referring to FIG. 5, the outer housing 22 is illustrated removed from the remaining portions of the reciprocating tool 10. Internal to the outer housing 22, a plurality of inwardly extending ribs 58A-58K form a portion of the egress path 42. Similar to the ribs 46A-46E formed on the gear casing 38, the ribs 58A-58K direct the flow or movement of the foreign material in the reciprocating tool 10 toward the window 54. Proximal to the window 54, a recess, or landing, 62 is formed in the outer housing 22 to collect any foreign material about to be expelled through the window 54.

Figure 6:
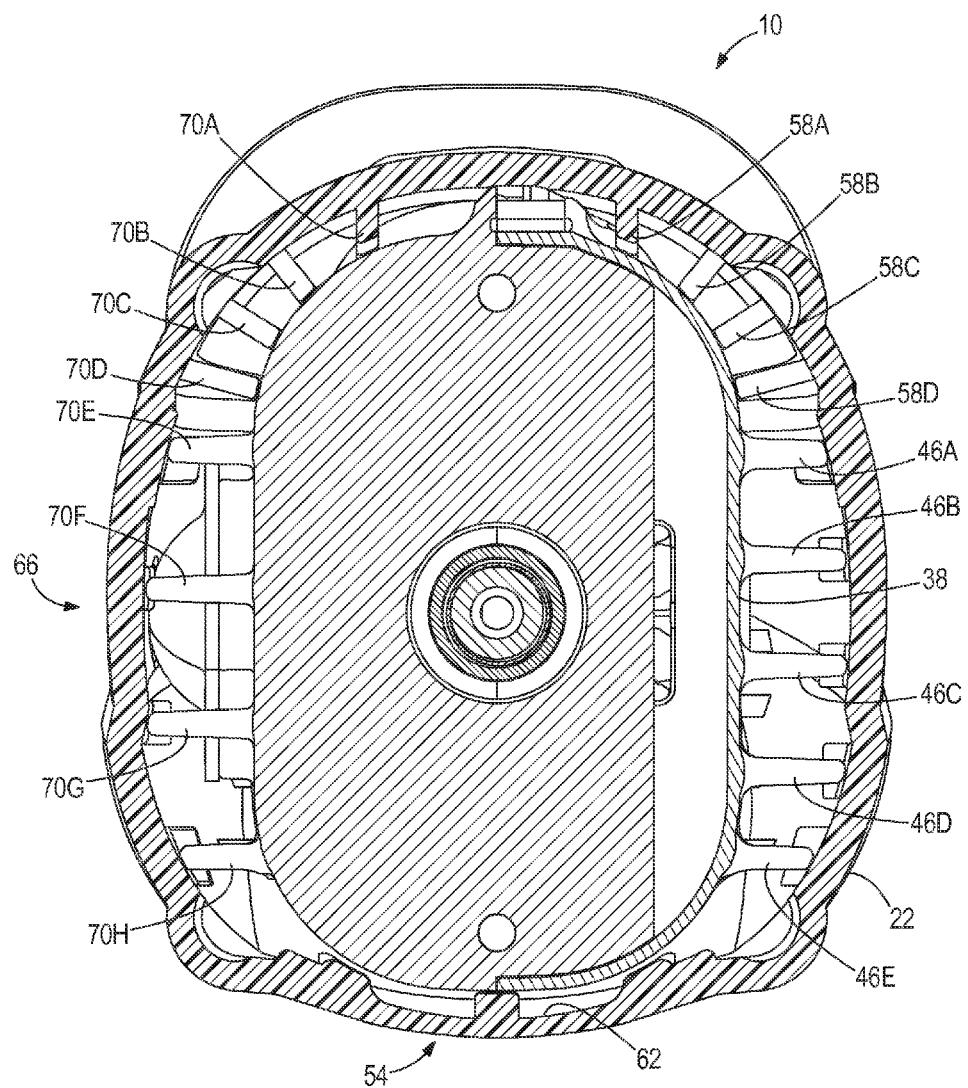
FIG. 6 is a cross-sectional view of the reciprocating saw of FIG. 1A taken along section 6-6.

With reference to FIG. 6, a cross-sectional view illustrates the gear casing 38 and outer housing 22 coupled together with ribs 46A-46E and 58A-58K extending in the spaced between the gear casing 28 and the outer housing 22, forming the egress path 42 therebetween. Also illustrated by FIG. 6 is an opposite side 66 of the reciprocating tool 10 with a similar, but not identical, arrangement of ribs 70A-70H extending from either the outer housing 22 or the gear casing 38 to form the egress path 42 on the side 66 of the reciprocating tool 10.

Additional rib orientations and geometries not detailed here are considered within the scope of the invention. For example, the ribs can be formed on both the gear casing 28 and the outer housing 22, or the ribs can be formed entirely on either one of the gear casing 28 or the outer housing 22. In addition, any number of ribs can be utilized on either the gear casing 38 or the outer housing 22 to create an egress path. In addition to forming the egress path 42, the ribs 46A-46E and 58A-58K discussed above exhibit additional functionality, including improved heat transfer, structural strength enhancement, and ease of alignment for manufacturability.

Although the invention has been described with reference to certain preferred embodiments, variations and modifications exist within the scope and spirit of one or more independent aspects of the invention as described. Various features and advantages of the invention are set forth in the following claims.

What is claimed is:

1. A reciprocating saw comprising:
    an outer housing positioned along a longitudinal axis of the reciprocating saw;
    a motor casing covering a portion of a motor;
    a blade driven by the motor to reciprocate along the longitudinal axis during a cutting operation;
    a gear casing positioned within the outer housing and coupled to the motor casing;
    a rib formed on either one of the gear casing and the outer housing and extending substantially parallel to the longitudinal axis;
    an end plate coupling the gear casing to the motor casing, wherein the rib is spaced apart from the end plate; and
    a window partially defined by at least one of the outer housing, the gear casing, and the motor casing,
    wherein the rib and the end plate form an egress path between the gear casing and the outer housing in communication with the window;
    wherein the rib is oriented to direct movement of a foreign material, which enters between the gear casing and the outer housing, along the egress path to the end plate during the cutting operation, where the foreign material is then directed toward the window.

2. The reciprocating saw of claim 1, wherein the foreign material is a liquid.

3. The reciprocating saw of claim 1, wherein the foreign material enters between the gear casing and the outer housing at a blade end of the reciprocating saw.

4. The reciprocating saw of claim 1, wherein the outer housing includes a recess formed proximal to the window.

5. The reciprocating saw of claim 4, wherein the recess collects the foreign material in the egress path to be expelled through the window.

6. The reciprocating saw of claim 1, wherein the window is formed partially in the outer housing and partially in the motor casing.

7. The reciprocating saw of claim 1, wherein the rib is a first rib and wherein the reciprocating saw further includes a second rib spaced apart from and substantially parallel to the first rib, the second rib extending substantially parallel to the longitudinal axis and forming part of the egress path.

8. The reciprocating saw of claim 1, wherein the rib is formed on the gear casing and extends outwardly from an outer surface of the gear casing.

9. The reciprocating saw of claim 1, wherein the foreign material flows along the rib toward the end plate where the foreign material is then directed toward the window.

10. A reciprocating saw comprising:
    a motor;
    a blade driven by the motor to reciprocate along a longitudinal axis during a cutting operation;
    an outer housing positioned along the longitudinal axis;
    a casing positioned within the outer housing;
    a rib formed on either one of the casing and the outer housing;
    an end plate coupling the casing to a motor casing, wherein the rib is spaced from the end plate; and
    a window formed in the outer housing,
    wherein the rib is oriented between the outer housing and the casing to direct movement of a foreign material entering between the outer housing and the casing to the end plate during the cutting operation, where the foreign material is then directed toward the window.

11. The reciprocating saw of claim 10, wherein the rib is a first rib and the reciprocating saw further includes a second rib oriented substantially parallel to the first rib.

12. The reciprocating saw of claim 11, wherein the first rib extends outwardly from an outer surface of the casing and the second rib extends inwardly from an inner surface of the outer housing.

13. The reciprocating saw of claim 10, wherein the outer housing includes a recess formed proximal to the window.

14. The reciprocating saw of claim 13, wherein the recess collects the foreign material to be expelled through the window.

15. The reciprocating saw of claim 10, wherein the end plate forms a boundary of the window.

16. The reciprocating saw of claim 10, wherein the foreign material enters between the casing and the outer housing at a blade end of the reciprocating saw.

17. The reciprocating saw of claim 16, wherein the window is formed in the outer housing at an end opposite the blade end.

\* \* \* \* \*